US010929570B2

(12) United States Patent
Zou et al.

(10) Patent No.: US 10,929,570 B2
(45) Date of Patent: Feb. 23, 2021

(54) METHOD, APPARATUS, AND ELECTRONIC DEVICE FOR BLOCKCHAIN-BASED INFRINGEMENT EVIDENCE STORAGE

(71) Applicant: ADVANCED NEW TECHNOLOGIES CO., LTD., Grand Cayman (KY)

(72) Inventors: Qimeng Zou, Hangzhou (CN); Linqing Wang, Hangzhou (CN); Haitao Jiang, Hangzhou (CN)

(73) Assignee: ADVANCED NEW TECHNOLOGIES CO., LTD., Grand Cayman (KY)

(*) Notice: Subject to any disclaimer, the term of this patent is extended or adjusted under 35 U.S.C. 154(b) by 0 days.

(21) Appl. No.: 16/870,410

(22) Filed: May 8, 2020

(65) Prior Publication Data

US 2020/0272768 A1 Aug. 27, 2020

Related U.S. Application Data

(63) Continuation of application No. PCT/CN2020/071148, filed on Jan. 9, 2020.

(30) Foreign Application Priority Data

May 17, 2019 (CN) .......................... 201910414160.3

(51) Int. Cl.
*H04L 29/06* (2006.01)
*G06F 21/64* (2013.01)
(Continued)

(52) U.S. Cl.
CPC .............. *G06F 21/64* (2013.01); *G06F 21/10* (2013.01); *G06F 21/602* (2013.01);
(Continued)

(58) Field of Classification Search
CPC ................ G06T 1/005; H04N 1/32101; H04N 2201/3233; H04N 2201/3235
(Continued)

(56) References Cited

U.S. PATENT DOCUMENTS 9,419,951 B1 8/2016 Felsher et al.
9,595,034 B2 3/2017 Van Rooyen et al.
(Continued)

FOREIGN PATENT DOCUMENTS

CN 106254078 A 12/2016
CN 107888375 A 4/2018
(Continued)

OTHER PUBLICATIONS

Supplementary Search for Chinese Application No. 201910414160.3 dated Jun. 30, 2020.
(Continued)

*Primary Examiner* — Evans Desrosiers

(57) ABSTRACT

Methods, systems, and apparatus, including computer programs encoded on computer storage media, for blockchain-based infringement evidence storage are provided. One of the methods include: obtaining a request for collecting evidence of infringement by an online resource, wherein the request comprises an address of the online resource; obtaining the evidence of infringement from the address of the online resource; storing verification information of the evidence of infringement on a blockchain; and storing the evidence of infringement in a cloud storage space.

14 Claims, 3 Drawing Sheets

(51) Int. Cl.
  *G06F 21/60* (2013.01)
  *G06F 21/62* (2013.01)
  *G06F 21/10* (2013.01)
  *H04L 9/32* (2006.01)
  *G06Q 30/00* (2012.01)
  *H04L 29/08* (2006.01)
  *G06Q 50/18* (2012.01)

(52) U.S. Cl.
  CPC ..... *G06F 21/6227* (2013.01); *G06Q 30/0185* (2013.01); *G06Q 50/184* (2013.01); *H04L 9/3247* (2013.01); *H04L 67/1097* (2013.01); *G06F 2221/0717* (2013.01); *G06F 2221/2107* (2013.01); *G06Q 2220/18* (2013.01)

(58) Field of Classification Search
  USPC .......................................................... 726/28
  See application file for complete search history.

(56) References Cited

U.S. PATENT DOCUMENTS

| | | | |
|---|---|---|---|
| 9,849,364 B2 | 12/2017 | Tran et al. | |
| 10,339,523 B2 | 7/2019 | McDonough et al. | |
| 2014/0074681 A1* | 3/2014 | Kim | G06Q 40/04 705/37 |
| 2016/0217436 A1 | 7/2016 | Brama | |
| 2016/0283920 A1 | 9/2016 | Fisher et al. | |
| 2016/0300234 A1 | 10/2016 | Moss-Pultz et al. | |
| 2017/0109735 A1 | 4/2017 | Sheng et al. | |
| 2017/0235970 A1 | 8/2017 | Conner | |
| 2017/0324711 A1 | 11/2017 | Feeney et al. | |
| 2018/0012311 A1 | 1/2018 | Small et al. | |
| 2018/0068091 A1 | 3/2018 | Gaidar et al. | |
| 2018/0096175 A1 | 4/2018 | Schmeling et al. | |
| 2018/0136633 A1 | 5/2018 | Small et al. | |
| 2018/0139056 A1 | 5/2018 | Imai et al. | |
| 2018/0216946 A1 | 8/2018 | Gueye | |
| 2018/0302417 A1 | 10/2018 | Wilson | |
| 2018/0374173 A1 | 12/2018 | Chen et al. | |
| 2019/0043048 A1 | 2/2019 | Wright et al. | |
| 2020/0065867 A1* | 2/2020 | Lim | G06Q 50/184 |
| 2020/0101367 A1 | 4/2020 | Tran et al. | |

FOREIGN PATENT DOCUMENTS

| | | |
|---|---|---|
| CN | 108055309 A | 5/2018 |
| CN | 108629038 A | 10/2018 |
| CN | 108717431 A | 10/2018 |
| CN | 108959416 A | 12/2018 |
| CN | 109002732 A | 12/2018 |
| CN | 109102437 A | 12/2018 |
| CN | 109194506 A | 1/2019 |
| CN | 109585885 A | 4/2019 |
| CN | 110263583 A | 9/2019 |

OTHER PUBLICATIONS

Second Office Action for Chinese Application No. 201910414160.3 dated Jul. 8, 2020.
First Search dated May 20, 2020, issued in related Chinese Application No. 201910414160.3 (2 pages).
First Office Action dated May 28, 2020, issued in related Chinese Application No. 201910414160.3, with English machine translation (19 pages).
Written Opinion and International Search Report for PCT Application No. PCT/CN2020/071148 made available to public on Nov. 26, 2020.

* cited by examiner

METHOD, APPARATUS, AND ELECTRONIC DEVICE FOR BLOCKCHAIN-BASED INFRINGEMENT EVIDENCE STORAGE

CROSS-REFERENCE TO RELATED APPLICATION

This application is a continuation application of International Patent Application No. PCT/CN2020/071148, filed with the China National Intellectual Property Administration (CNIPA) of People's Republic of China on Jan. 9, 2020, which is based on and claims priority to and benefit of Chinese Patent Application No. 201910414160.3, filed with the CNIPA on May 17, 2019. The entire contents of all of the above-identified applications are incorporated herein by reference.

TECHNICAL FIELD

The specification relates to the field of computer technologies, and in particular, to a method and an apparatus for blockchain-based infringement evidence storage, and an electronic device thereof.

BACKGROUND

Along with the rapid development of mobile Internet technologies nowadays, there are more and more Internet infringement activities. For example, it may be possible that original works such as articles published by original authors on the Internet are infringed, including plagiarized, stolen, or misused.

To safeguard his/her interests, an infringed party or right owner may initiate an infringement lawsuit against an infringer when finding that the original works published by the infringed party on the Internet are infringed by the infringer. A court and other judicial agencies that accept and hear infringement actions need to determine whether infringement activities of infringers are established based on relevant infringement evidence. Therefore, an infringed party is required to provide judicial agencies with reliable evidence regarding the relevant infringement activities of an infringer.

However, since the relevant infringement activities of an infringer take place on the Internet, it is possible that some infringement records collected by an infringed party are altered. Therefore, solutions are still needed to ensure that an infringed party collects reliable evidence regarding the relevant infringement activities of an infringer and then to safeguard the infringed party's interests.

SUMMARY

Embodiments of the specification provide a method and an apparatus for blockchain-based infringement evidence storage, and an electronic device thereof, so as to solve the existing problem that it is possible that some infringement records collected by an infringed party may be altered.

To solve the above-described technical problem, the embodiments of the specification are implemented as follows.

According to a first aspect, a method for blockchain-based infringement evidence storage is provided. The method comprises: obtaining an infringement evidence collection request for an Internet infringing resource, the infringement evidence collection request carrying an infringement address of the Internet infringing resource; obtaining, based on the infringement evidence collection request, infringement evidence of the Internet infringing resource from the infringement address; and uploading irreversible verification information of the infringement evidence to a blockchain.

According to a second aspect, an apparatus for blockchain-based infringement evidence storage is provided. The apparatus comprises: a first obtaining unit configured to obtain an infringement evidence collection request for an Internet infringing resource, the infringement evidence collection request carrying an infringement address of the Internet infringing resource; a second obtaining unit configured to obtain, based on the infringement evidence collection request, infringement evidence of the Internet infringing resource from the infringement address; and an uploading unit configured to upload irreversible verification information of the infringement evidence to a blockchain.

According to a third aspect, an electronic device is provided, comprising: a processor; and a memory configured to store a computer executable instruction, wherein the executable instruction, when being executed, causes the processor to execute the following operations: obtaining an infringement evidence collection request for an Internet infringing resource, the infringement evidence collection request carrying an infringement address of the Internet infringing resource; obtaining, based on the infringement evidence collection request, infringement evidence of the Internet infringing resource from the infringement address; and uploading irreversible verification information of the infringement evidence to a blockchain.

According to a fourth aspect, a computer readable storage medium is provided, wherein the computer readable storage medium stores one or more programs, and the one or more programs, when being executed by an electronic device comprising a plurality of applications, cause the electronic device to execute the following operations: obtaining an infringement evidence collection request for an Internet infringing resource, the infringement evidence collection request carrying an infringement address of the Internet infringing resource; obtaining, based on the infringement evidence collection request, infringement evidence of the Internet infringing resource from the infringement address; uploading irreversible verification information of the infringement evidence to a blockchain; and storing the infringement evidence in a cloud storage space.

The above technical solutions adopted by the embodiments of the specification at least can achieve the following technical effects.

According to another aspect, a method for blockchain-based evidence storage is provided. The method may comprise: obtaining a request for collecting evidence of infringement by an online resource, wherein the request comprises an address of the online resource; obtaining the evidence of infringement from the address of the online resource; storing verification information of the evidence of infringement on a blockchain; and storing the evidence of infringement in a cloud storage space.

In an embodiment, the obtaining the evidence of infringement from the address of the online resource may comprise: creating, based on the request for collecting evidence of infringement, an infringement evidence collection task, the infringement evidence collection task comprising the evidence of infringement from the address of the online resource; and executing the infringement evidence collection task in a trusted environment.

In an embodiment, after storing verification information of the evidence of infringement on a blockchain, the method may further comprise obtaining, from the blockchain, a certificate of trusted evidence for the infringement evidence, the certificate comprising the address of the online resource, an address of a block on the blockchain storing the verification information, or identity information of a sender of the request for collecting evidence of infringement.

In an embodiment, the storing the evidence of infringement in a cloud storage space may comprise: obtaining a packaged file comprising the infringement evidence; storing the packaged file in the cloud storage space; and obtaining an access address of the packaged file in the cloud storage space.

In an embodiment, the method may further comprise sending, to a sender of the request for collecting evidence of infringement, the verification information, the packaged file, the access address of the packaged file, and the certificate of trusted evidence.

In an embodiment, the infringement evidence may comprise a routing process associated with the address of the online resource, a responsiveness status associated with the address of the online resource, content associated with the address of the online resource, a screenshot image associated with the address of the online resource, or a video record associated with the address of the online resource.

In an embodiment, the verification information of the evidence of infringement may comprise a digest of the infringement evidence, or a signature by a node associated with the blockchain on the digest of the infringement evidence.

According to another aspect, a system for blockchain-based evidence storage is provided. The system may comprise a processor and a non-transitory computer-readable storage medium storing instructions executable by the processor to cause the system to perform operations comprising: obtaining a request for collecting evidence of infringement by an online resource, wherein the request comprises an address of the online resource; obtaining the evidence of infringement from the address of the online resource; storing verification information of the evidence of infringement on a blockchain; and storing the evidence of infringement in a cloud storage space.

According to another aspect, a non-transitory computer-readable storage medium for blockchain-based evidence storage is provided. The storage medium may be configured with instructions executable by one or more processors to cause the one or more processors to perform operations comprising: obtaining a request for collecting evidence of infringement by an online resource, wherein the request comprises an address of the online resource; obtaining the evidence of infringement from the address of the online resource; storing verification information of the evidence of infringement on a blockchain; and storing the evidence of infringement in a cloud storage space.

When obtaining the infringement evidence against the Internet infringing resource, an infringement evidence collection request for the Internet infringing resource can be obtained, and the infringement evidence collection request carries an infringement address of the Internet infringing resource. Based on the infringement evidence collection request, the infringement evidence of the Internet infringing resource is obtained from the infringement address, and irreversible verification information of the infringement evidence is then uploaded to a blockchain. Due to the characteristic that information recorded in a blockchain is immutable and the characteristic that a method for generating the irreversible verification information is irreversible, uploading the irreversible verification information of the infringement evidence to the blockchain may enable the verifications of authenticity and validity of the infringement evidence for future uses of the infringement evidence, and improve the trustworthiness of the obtained infringement evidence.

BRIEF DESCRIPTION OF THE DRAWINGS

The accompanying drawings described in the specification are used to provide a further understanding of the specification and constitute a part of the specification. The embodiments of the specification and description of the embodiments are used to explain the specification, and do not constitute limitations to the specification.

DETAILED DESCRIPTION

To make objectives, technical solutions, and advantages of the specification clearer, the technical solutions of the specification will be clearly and completely described below with reference to the embodiments and the accompanying drawings of the specification. The described embodiments merely include some, but not all, embodiments of the specification. Based on the embodiments of the specification, all other embodiments obtainable by one of ordinary skill in the art without creative effort shall fall within the scope of the specification.

The technical solutions provided in the embodiments of the specification will be described in detail below with reference to the accompanying drawings.

To solve the existing problem that it is possible that some infringement records collected by an infringed party are be altered, the embodiments of the specification provide a method for blockchain-based infringement evidence storage. Entities to execute the method provided by the embodiments of the specification may include, but are not limited to, at least one of apparatuses including a content capture platform and others, which can be configured to execute the method provided by the embodiments of the specification.

For ease of description, a content capture platform capable of executing the method is used as an example as an entity to execute the method to describe implementation of the method. The entity executes the method may include, but not limited to, a content capture platform.

Figure 1:
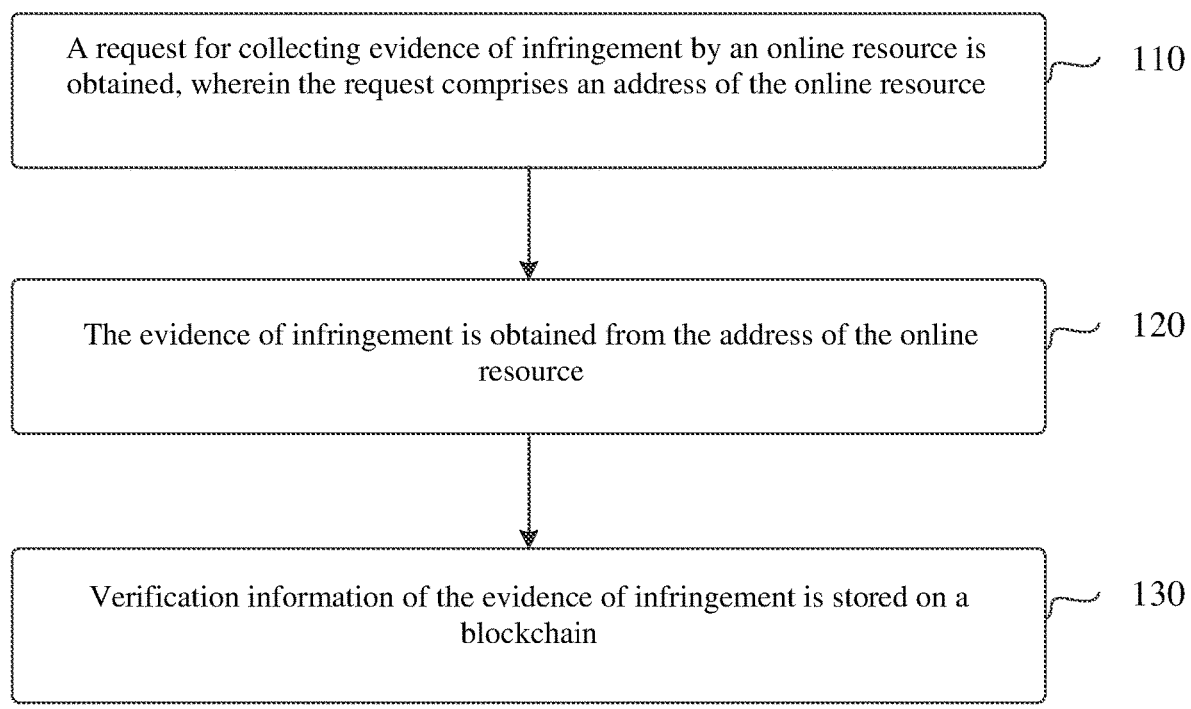
FIG. 1 is a flow chart of a method for blockchain-based infringement evidence storage according to some embodiments of the specification.

According to one or more embodiments of the specification, a flow chart of a method for blockchain-based infringement evidence storage is shown in FIG. 1. The method comprises the following steps.

In Step 110, a request for collecting evidence of infringement (i.e., an infringement evidence collection request) by an online resource (i.e., an Internet infringing resource) is obtained, wherein the request comprises an address of the online resource (i.e., an infringement address of the Internet infringing resource.)

An Internet infringing resource may include original works, such as an original novel, an original essay, and the like, of an original author. An infringer forwards, cites, or even plagiarizes the Internet infringing resource on a website without an authorization by the original author. In other words, an Internet infringing resource may often correspond to one or more infringement addresses. In order to obtain infringement evidence of the Internet infringing resource, an infringement address of the Internet infringing resource needs to be obtained, and the infringement evidence of the Internet infringing resource is obtained from the infringement address.

In an embodiment, an infringement address of the Internet infringing resource may often be in a form of Uniform Resource Locator (URL). The URL is a concise representation of locations and access methods of resources that may be obtained from the Internet, and is an address of standard resources on the Internet. Each file on the Internet has a unique URL, and the information comprised in the URL indicates a location of the corresponding file and how a browser should process the URL.

In an embodiment, if an infringed party (such as an original author of an article A) finds, while browsing a webpage a, that the interface displayed by the webpage comprises a large portion and amount of texts of the article A, without referring to the reference source or being authorized by the infringed party, then, the content displayed by the webpage may constitute an infringement action against the infringed party. To safeguard his/her own rights and interests, the infringed party may initiate an infringement evidence collection request for collecting evidence of infringement for the Internet infringing resource to an infringement evidence collection platform, and incorporate the URL of the webpage a in the infringement evidence collection request. The infringement evidence collection platform obtains, based on the infringement evidence collection request, the infringement evidence of the webpage a from the URL of the webpage a.

In Step 120, based on the infringement evidence collection request, the evidence of infringement is obtained from the address of the online resource.

In some embodiments of the specification, to prevent the evidence collection process from being affected by external factors which makes the obtained infringement evidence lack trustworthiness, the infringement evidence collection platform may complete the entire evidence collection process in a trusted environment, which may be a portable container isolated from the external environment.

Then, based on the infringement evidence collection request, obtaining the infringement evidence of the Internet infringing resource from the infringement address comprises: creating, based on the infringement evidence collection request, an infringement evidence collection task, the infringement evidence collection task comprising obtaining infringement evidence of the Internet infringing resource from the infringement address; and activating a trusted environment and executing the infringement evidence collection task in the trusted environment.

In an embodiment, the trusted environment may be realized through a Docker container. The Docker container is an open-source application container engine. Developers may package applications and dependent packages that they have developed into a portable Docker container, and then publish them to any popular Linux machines. Alternatively, virtualization may be achieved. Moreover, the Docker container fully adopts the sandbox mechanism. There is no interface nor mutual impact between Docker containers. With the trusted environment realized by the Docker container, it can be ensured that the execution of an infringement evidence collection task in the Docker container will not be affected by the external environment, such that the obtained infringement evidence of the Internet infringing resource has higher trustworthiness.

There is no mutual impact between Docker containers due to the absence of any interface between the Docker containers. Therefore, in one or more embodiments of the specification, a terminal infringement evidence collection platform may receive a plurality of infringement evidence collection requests from a plurality of infringed parties, wherein each infringement evidence collection task may carry an infringement address of a corresponding Internet infringing resource. Based on the plurality of infringement evidence collection requests, a plurality of corresponding infringement evidence collection tasks are created. Each infringement evidence collection task may comprise obtaining infringement evidence of the corresponding Internet infringing resource from the corresponding infringement address. Finally, a plurality of corresponding trusted environments, i.e., a plurality of Docker containers, are activated to execute, in parallel, respective infringement evidence collection tasks in the plurality of Docker containers.

In one or more embodiments of the specification, after the infringement evidence of the Internet infringing resource is obtained from the infringement address based on the infringement evidence collection request, to facilitate courts and other relevant judicial agencies to search for the infringement evidence of the Internet infringing resource when safeguarding the infringed party's interests at a later time, the infringement evidence may be packaged, uploaded, and stored in a preset cloud storage space, and an access address of the infringement evidence returned by the preset cloud storage space may be obtained.

After the infringement evidence of the Internet infringing resource is obtained from the infringement address based on the infringement evidence collection request, the method further comprises: packaging the infringement evidence to obtain a packaged file of the infringement evidence; and uploading and storing the packaged file of the infringement evidence to the preset cloud storage space, and obtaining an access address of the packaged file of the infringement evidence returned by the preset cloud storage space.

In one or more embodiments of the specification, the access address of the infringement evidence returned by the preset cloud storage space may be effective only for a period of time, to prevent the infringement evidence from being disseminated with no restriction. In other words, the access address of the infringement evidence can be accessed only in a preset effective period of time, such as 3 days or 7 days. After obtaining the access address of the infringement evidence, the infringed party or a court and other relevant judicial agencies can only access the access address of the infringement evidence within the preset effective period of time from the day when the access address is obtained. After the preset effective period of time expires, the access address of the infringement evidence becomes invalid.

In one or more embodiments of the specification, to ensure the legal effect of the infringement evidence, the infringement evidence may comprise at least one piece of the following information: a routing process of the infringement address; a response state or a responsiveness status obtained after the infringement address is accessed; response content associated with the infringement address obtained after the infringement address is accessed; a screenshot image of a page after the infringement address is accessed; and a video record of a page after the infringement address is accessed.

Herein, the routing process of the infringement address is a request process of the infringement evidence collection platform for accessing the infringement address via a browser. The responsiveness status associated with the infringement address may comprise a responding state and a non-responding state. The responding state indicates that the infringement address can be normally accessed by a browser. The non-responding state indicates that the infringement address cannot be normally accessed by a browser, such that the infringement address may be invalid, incorrect, or have other issues. The response content associated with the infringement address may comprise the content displayed after the infringement address is accessed by a browser, such as text information, image information, or video information. The screenshot image associated with the infringement address may comprise a screenshot image of an interface displayed after the infringement address is accessed and rendered by a browser.

To better present evidence for some Internet infringing resources related to video resources in a later judicial procedure, a video record associated with the infringement address may also be obtained as the infringement evidence of the Internet infringing resources.

In Step 130, verification information (i.e., irreversible verification information) of the evidence of infringement is stored on a blockchain.

Because of the limited storage space of each block in a blockchain, data that takes up a large space may not be suitable for storage. The infringement evidence often comprises images and even videos. If the entire infringement evidence is uploaded to the blockchain, it may impose a storage burden on the storage space of the blockchain. In this case, an irreversible encryption algorithm, such as a digest algorithm, may be used to encrypt the original content (i.e., the original infringement evidence) to obtain the irreversible verification information of the original content. Then, the irreversible verification information of the original infringement evidence is stored in the blockchain.

In some embodiments, the irreversible verification information of the infringement evidence comprises at least one of the following: a digest of the infringement evidence; and a signature by an infringement evidence collection node in the blockchain on the digest of the infringement evidence.

Herein, the irreversible encryption algorithm is a one-way encryption algorithm, which can process an original file (i.e., the original infringement evidence) into characters of a fixed length. Common irreversible encryption algorithms may include MD5, SHA series, and the like. In the embodiments of the specification, the infringement evidence may be encrypted using an irreversible encryption algorithm to obtain a digest of the infringement evidence, and the digest of the infringement evidence may be uploaded to the blockchain. Alternatively, the digest of the infringement evidence may be signed through a private key of an infringement evidence collection node, and the signature may be uploaded to the blockchain.

In one or more embodiments of the specification, to confirm that the irreversible verification information of the infringement evidence has been uploaded to the blockchain and to ensure that the infringement evidence is trustworthy, after the irreversible verification information of the infringement evidence is uploaded to the blockchain, the method further comprises obtaining a certificate of trusted evidence for the infringement evidence that is returned by the blockchain.

Herein, to ensure the traceability after the irreversible verification information of the infringement evidence is uploaded to the blockchain, the certificate of trusted evidence for the infringement evidence comprises at least one of the following: an infringement address of the Internet infringing resource; a block address on the blockchain where the irreversible verification information of the infringement evidence is stored; and identity information of a requester, such as a sender, of the infringement evidence collection request.

For example, the identity information of a requester corresponding to the infringement evidence collection request may include identity information like names and contact information of the requester.

It is very difficult to tamper with data in a blockchain due to the storage mechanism of the blockchain, thus, the data is substantially immutable. Based on this characteristic of the blockchain, data in a blockchain may be considered as immutable and trustworthy data.

To improve the trustworthiness of the infringement evidence, the certificate of trusted evidence for the infringement evidence may be pre-authenticated uniformly by courts and other relevant judicial agencies. In other words, certain consensus is reached among courts and other relevant judicial agencies that the legal effect of the certificate of trusted evidence for the infringement evidence is unanimously recognized.

In one or more embodiments of the specification, to enable a requester corresponding to the infringement evidence collection request, such as an infringed party or a court and other relevant judicial agencies, to obtain the infringement evidence and to verify the trustworthiness of the infringement evidence, after the access address of the infringement evidence returned by the preset cloud storage space is obtained, the method further comprises receiving a request of obtaining the infringement evidence from the requester corresponding to the infringement evidence collection request, and sending a digest of the infringement evidence, the packaged file of the infringement evidence, the access address of the infringement evidence, and the certificate of trusted evidence of the infringement evidence to the requester corresponding to the infringement evidence collection request.

For example, the irreversible verification information of the infringement evidence may comprise a digest of the infringement evidence. After obtaining the digest of the infringement evidence and the access address of the infringement evidence, the requester corresponding to the infringement evidence collection request may calculate a digest of the infringement evidence based on the full infringement evidence, and compare the calculated digest of the infringement evidence with the obtained digest of the infringement evidence. If the calculated digest of the infringement evidence is the same as the obtained digest of the infringement evidence, it indicates that the infringement evidence has not been tampered with and is trustworthy. At the same time, the certificate of trusted evidence for the infringement evidence further enhances the trustworthiness of the infringement evidence.

For another example, the irreversible verification information of the infringement evidence may comprise a signature by an infringement evidence collection node on the digest of the infringement evidence. After obtaining the signature by an infringement evidence collection node on the digest of the infringement evidence and the access address of the infringement evidence, the requester corresponding to the infringement evidence collection request may calculate a digest of the infringement evidence based on the full infringement evidence, decrypt the obtained signature by an infringement evidence collection node on the digest of the infringement evidence using a public key to obtain a decrypted digest, and compare the decrypted digest with the obtained digest of the infringement evidence. If the calculated digest of the infringement evidence is the same as the obtained digest of the infringement evidence, it indicates that the infringement evidence has not been tampered with and is trustworthy. At the same time, the certificate of trusted evidence for the infringement evidence further enhances the trustworthiness of the infringement evidence.

Figure 2:
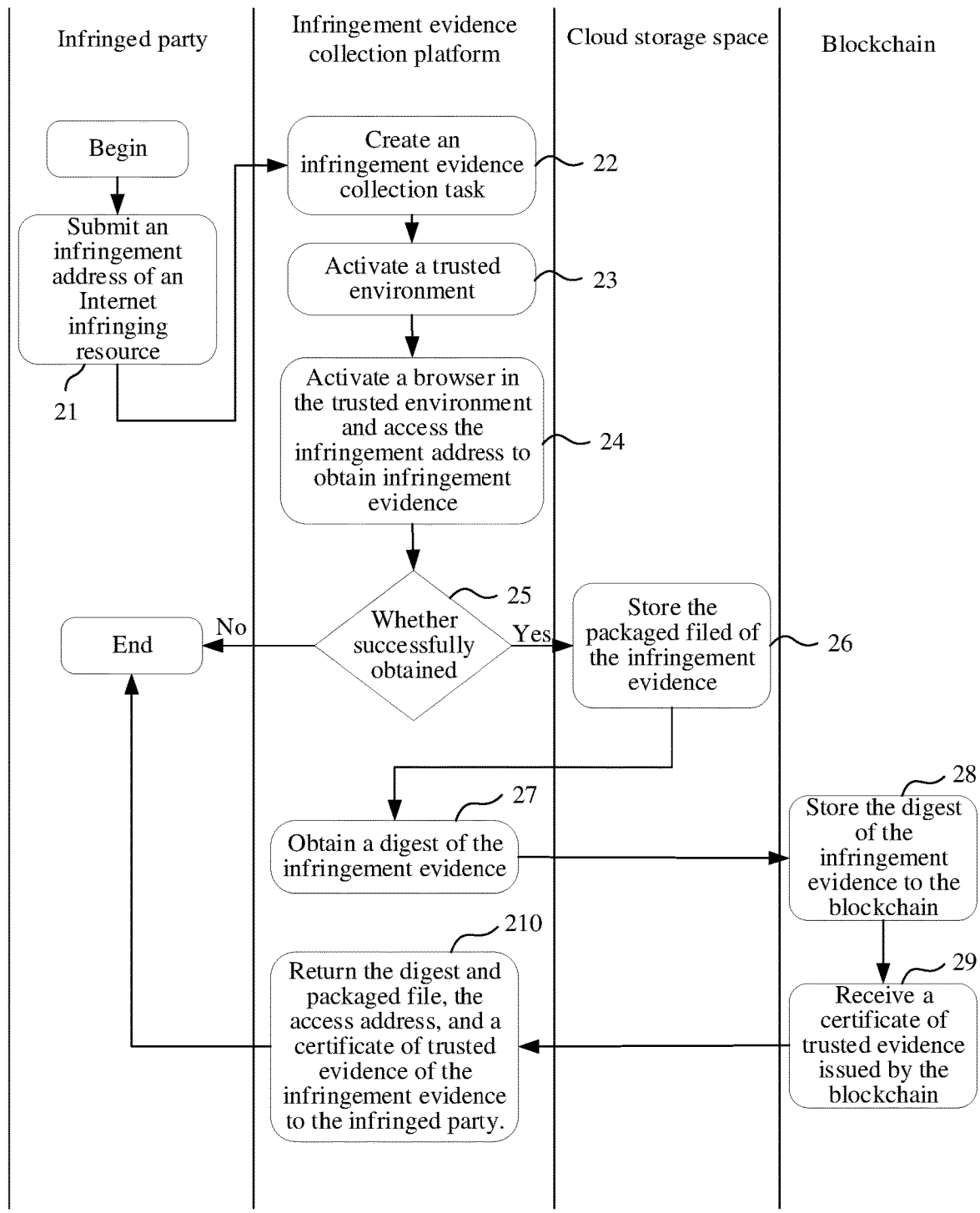
FIG. 2 is a schematic diagram of an application of the method for blockchain-based infringement evidence storage in a scenario according to some embodiments of the specification.

The method provided in the embodiments of the specification will be described in detail below with the flow chart of an application of the method for blockchain-based infringement evidence storage in a scenario as shown in FIG. 2. As shown in FIG. 2, the implementation process of the method for blockchain-based infringement evidence storage involves an infringed party, an infringement evidence collection platform, a cloud storage space, and a blockchain, and the method may comprise, the following main steps.

In S21, an infringed party submits an infringement address of an Internet infringing resource to an infringement evidence collection platform, wherein the infringement address may include a URL of the Internet infringing resource.

In S22, the infringement evidence collection platform creates, based on the infringement address of the Internet infringing resource submitted by the infringed party, an infringement evidence collection task, wherein the infringement evidence collection task comprises obtaining the infringement evidence of the Internet infringing resource from the infringement address of the Internet infringing resource.

To facilitate a relevant judicial agency to enter an infringement judgment at a later time against an infringer of the Internet infringing resource, the infringement evidence may comprise a routing response process, a request header, a responsiveness status, and response content of the infringement address of the Internet infringing resource, a screenshot image and/or screen video of a page after the infringement address of the Internet infringing resource is opened and rendered by a browser, and the like.

In S23, the infringement evidence collection platform activates a trusted environment, for example, a Docker container having an isolation function, to execute the infringement evidence collection task in the trusted environment (e.g., a Docker container).

In S24, the infringement evidence collection platform activates a browser in the trusted environment, and accesses the infringement address of the Internet infringing resource via the browser, to obtain infringement evidence of the Internet infringing resource.

In S25, the infringement evidence collection platform determines whether infringement evidence of the Internet infringing resource may be obtained in the trusted environment.

If the infringement evidence of the Internet infringing resource is successfully obtained, the method proceeds to S26. If the infringement evidence of the Internet infringing resource is not successfully obtained, the entire process flow is ended.

In S26, the infringement evidence collection platform packages and stores the obtained infringement evidence of the Internet infringing resource into the cloud storage space, and an access address of the infringement evidence returned by the cloud storage space is obtained. The cloud storage space may include Object Storage Service (OSS).

In S27, the infringement evidence collection platform calculates and obtains a digest of the infringement evidence of the Internet infringing resource.

In S28, the infringement evidence collection platform uploads the digest of the Internet infringing evidence to the blockchain.

In S29, the infringement evidence collection platform receives a certificate of trusted evidence issued by the blockchain on the digest of the infringement evidence of the Internet infringing resource.

In S210, the infringement evidence collection platform returns the digest and packaged file of the infringement evidence of the Internet infringing resource, the access address of the infringement evidence of the Internet infringing resource, and the certificate of trusted evidence for the infringement evidence to the infringed party.

When obtaining the infringement evidence against the Internet infringing resource, an infringement evidence collection request for the Internet infringing resource can be obtained, and the infringement evidence collection request may carry an infringement address of the Internet infringing resource. Based on the infringement evidence collection request, the infringement evidence of the Internet infringing resource is obtained from the infringement address, and irreversible verification information of the infringement evidence is then uploaded to a blockchain. Due to the characteristic that information recorded in a blockchain is immutable and the characteristic that a method for generating the irreversible verification information is irreversible, uploading the irreversible verification information of the infringement evidence to the blockchain may enable the verifications of authenticity and validity of the infringement evidence for future uses of the infringement evidence, and improve the trustworthiness of the obtained infringement evidence.

Figure 3:
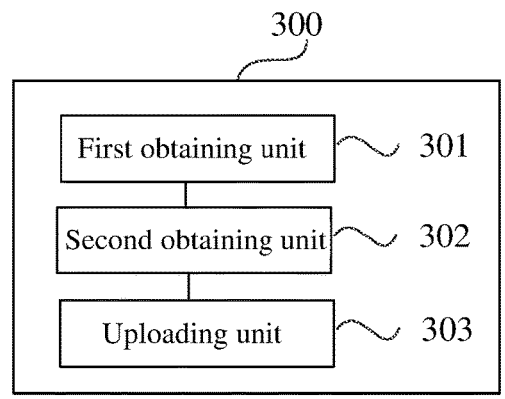
FIG. 3 is a schematic structural diagram of an apparatus for blockchain-based infringement evidence storage according to some embodiments of the specification.

FIG. 3 is a schematic structural diagram of an apparatus 300 for blockchain-based infringement evidence storage according to some embodiments of the specification. Referring to FIG. 3, in a software implementation, the apparatus 300 for blockchain-based infringement evidence storage may comprise a first obtaining unit 301, a second obtaining unit 302, and an uploading unit 303.

The first obtaining unit 301 is configured to obtain an infringement evidence collection request for an Internet infringing resource, and the infringement evidence collection request may include an infringement address of the Internet infringing resource.

The second obtaining unit 302 is configured to obtain, based on the infringement evidence collection request, infringement evidence of the Internet infringing resource from the infringement address.

The uploading unit 303 is configured to upload irreversible verification information of the infringement evidence to a blockchain.

According to some embodiments of the specification, when obtaining the infringement evidence against the Internet infringing resource, the apparatus 300 for blockchain-based infringement evidence storage can obtain an infringement evidence collection request for the Internet infringing resource through the first obtaining unit 301, and the infringement evidence collection request may carry an infringement address of the Internet infringing resource. Based on the infringement evidence collection request, the infringement evidence of the Internet infringing resource from the infringement address may be obtained through the second obtaining unit 302, and then irreversible verification information of the infringement evidence is uploaded to a blockchain through the uploading unit 303. Due to the characteristic that information recorded in a blockchain is immutable and the characteristic that a method for generating the irreversible verification information is irreversible, uploading the irreversible verification information of the infringement evidence to the blockchain may enable the verifications of authenticity and validity of the infringement evidence for future uses of the infringement evidence, and improve the trustworthiness of the obtained infringement evidence.

In one embodiment, the second obtaining unit 302 is configured to create, based on the infringement evidence collection request, an infringement evidence collection task, the infringement evidence collection task may comprise obtaining infringement evidence of the Internet infringing resource from the infringement address, activating a trusted environment, and executing the infringement evidence collection task in the trusted environment.

In one embodiment, after the uploading unit 303 uploads irreversible verification information of the infringement evidence to the blockchain, the apparatus further comprises a third obtaining unit (not shown) configured to obtain a certificate of trusted evidence for the infringement evidence that is returned by the blockchain.

In one embodiment, after the second obtaining unit 302 obtains, based on the infringement evidence collection request, the infringement evidence of the Internet infringing resource from the infringement address, the apparatus further comprises an evidence packaging unit (not shown) configured to package the infringement evidence to obtain a packaged file of the infringement evidence, and a first uploading unit (not shown) configured to upload the packaged file of the infringement evidence to a preset cloud storage space and obtain an access address of the infringement evidence returned by the preset cloud storage space.

In one embodiment, after the first uploading unit obtains an access address of the infringement evidence returned by the preset cloud storage space, the apparatus further comprises a receiving unit (not shown) configured to receive an request of obtaining the infringement evidence from a requester corresponding to the infringement evidence collection request, and a sending unit (not shown) configured to send a digest of the infringement evidence, the packaged file of the infringement evidence, the access address of the infringement evidence, and the certificate of trusted evidence for the infringement evidence to the requester corresponding to the infringement evidence collection request.

In one embodiment, the certificate of trusted evidence of the infringement evidence comprises at least one of the following: an infringement address of the Internet infringing resource; a block address on the blockchain where the irreversible verification information of the infringement evidence is stored; and identity information of the requester or sender of the infringement evidence collection request.

In one embodiment, the infringement evidence comprises at least one piece of the following information: a routing process of the infringement address; a response state or responsiveness status after the infringement address is accessed; response content after the infringement address is accessed; a screenshot image after the infringement address is accessed; and a video after the infringement address is accessed.

In one embodiment, the irreversible verification information of the infringement evidence comprises at least one of a digest of the infringement evidence and a signature by an infringement evidence collection node in the blockchain on the digest of the infringement evidence.

The apparatus 300 for blockchain-based infringement evidence storage can implement the methods in the method embodiments shown in FIG. 1 to FIG. 2. Reference may be made to the method for blockchain-based infringement evidence storage of the embodiments shown in FIG. 1 to FIG. 2, which will not be elaborated herein.

Figure 4:
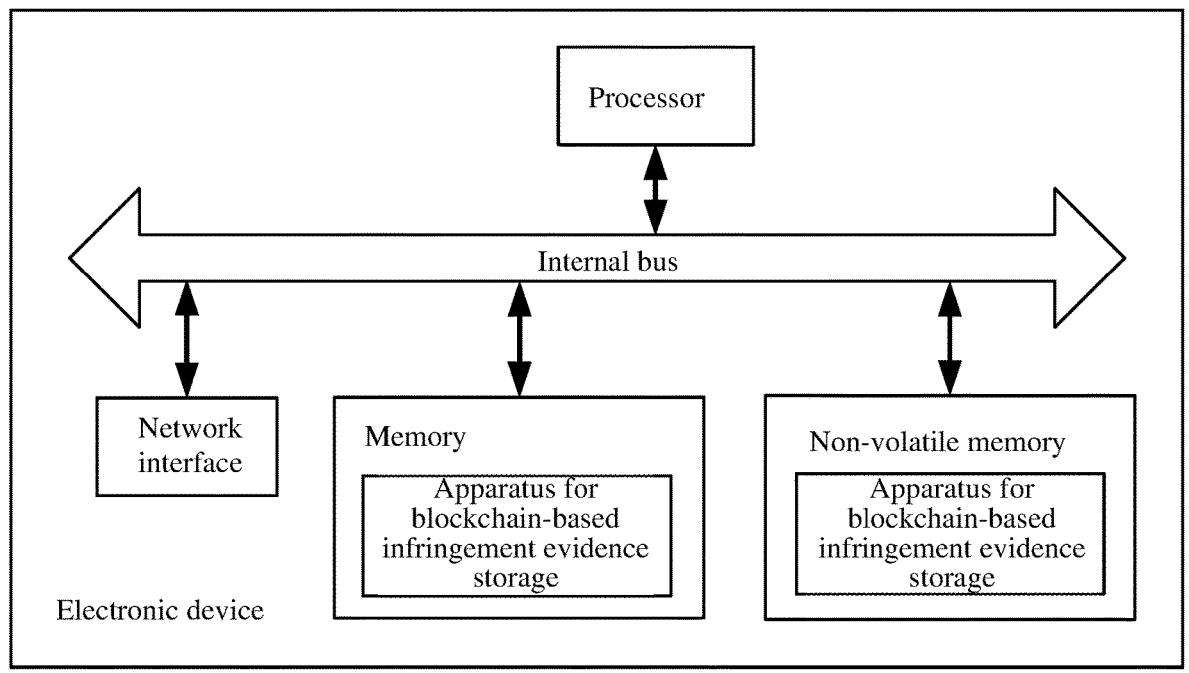
FIG. 4 is a schematic structural diagram of an electronic device according to some embodiments of the specification.

FIG. 4 is a schematic structural diagram of an electronic device according to some embodiments of the specification. Referring to FIG. 4, on a hardware level, the electronic device comprises a processor, and may further comprise an internal bus, a network interface, and a storage device, wherein the storage device may comprise a memory, such as a Random-Access Memory (RAM) and may further comprise a non-volatile memory, such as at least one magnetic disk. The electronic device may further comprise hardware required by other transactions.

The processor, the network interface, and the storage device may be connected to each other via the internal bus. The internal bus may be an Industry Standard Architecture (ISA) bus, a Peripheral Component Interconnect (PCI) bus, or an Extended Industry Standard Architecture (EISA) bus. The bus may be divided into an address bus, a data bus, or a control bus. For ease of presentation, only one two-way arrow is used in FIG. 4, which does not indicate only one bus or one type of buses is used.

The storage device is configured to store a program. For example, the program may comprise program codes, and the program codes comprise computer operation instructions. The storage device may comprise a memory and a non-volatile memory, and provide instructions and data to the processor.

The processor reads a corresponding computer program into the memory from the non-volatile memory and then runs the computer program to form the apparatus for blockchain-based infringement evidence storage on the logic level. The processor executes the program stored in the memory and is configured, for example, to execute the following operations: obtaining an infringement evidence collection request for an Internet infringing resource, the infringement evidence collection request comprising an infringement address of the Internet infringing resource; obtaining, based on the infringement evidence collection request, infringement evidence of the Internet infringing resource from the infringement address; uploading irreversible verification information of the infringement evidence to a blockchain; and storing the infringement evidence in a cloud storage space.

When obtaining the infringement evidence against the Internet infringing resource, an infringement evidence collection request for the Internet infringing resource can be obtained, and the infringement evidence collection request may carry an infringement address of the Internet infringing resource. Based on the infringement evidence collection request, the infringement evidence of the Internet infringing resource is obtained from the infringement address, and irreversible verification information of the infringement evidence is then uploaded to a blockchain. Due to the characteristic that information recorded in a blockchain is immutable and the characteristic that a method for generating the irreversible verification information is irreversible, uploading the irreversible verification information of the infringement evidence to the blockchain may enable the verifications of authenticity and validity of the infringement evidence for future uses of the infringement evidence, and improve the trustworthiness of the obtained infringement evidence.

The above-described method for blockchain-based infringement evidence storage disclosed by the embodiments shown in FIG. 1 to FIG. 2 of the specification may be applied to the processor or implemented by the processor. The processor may be an integrated circuit chip and has signal processing capabilities. In an embodiment, steps of the above-described method may be completed by a hardware integrated logic circuit or an instruction in the form of software in the processor. The above-described processor may be a general-purpose processor, including a Central Processing Unit (CPU), a Network Processor (NP) and the like, and may also be a Digital Signal Processor (DSP), an Application Specific Integrated Circuit (ASIC), a Field-Programmable Gate Array (FPGA) or other programmable logic devices, discrete gates, transistor logic devices, and discrete hardware components, which can implement or execute various methods, steps and logic block diagrams disclosed in one or more embodiments of the specification. The general-purpose processor may be a micro-processor, or the processor may be any conventional processor. Steps of the method disclosed in combination with one or more embodiments of the specification may be directly embodied as being executed and completed by a hardware decoding processor or by a combination of hardware and software modules in a decoding processor. The software modules may be located in a mature storage medium in the art, such as a random-access memory, a flash memory, a read-only memory, a programmable read-only memory or an electrically erasable programmable memory, a register, and the like. The storage medium is located in the storage device, and the processor reads information in the storage device and completes steps of the above-described method in combination with the hardware of the processor.

When the functions disclosed herein are implemented in the form of software functional units and sold or used as independent products, they can be stored in a processor executable non-volatile computer readable storage medium. Particular technical solutions disclosed herein (in whole or in part) or aspects that contributes to current technologies may be embodied in the form of a software product. The software product may be stored in a storage medium, comprising a number of instructions to cause a computing device (which may be a personal computer, a server, a network device, and the like) to execute all or some steps of the methods of the embodiments. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

The electronic device may be further configured to implement the method for blockchain-based infringement evidence storage shown in FIG. 1 to FIG. 2, which will not be elaborated herein.

In addition to the software implementation, the electronic device according to the specification does not exclude other implementations, such as logic devices or a combination of software and hardware. In other words, the execution entities of the following processing flow are not limited to various logic units, but may also be hardware or logic devices.

In summary, the above description includes only some embodiments of the specification, which do not limit the scope of the specification. Any modifications, equivalent substitutions, improvements, etc. made within the spirit and principle of one or more embodiments of the specification shall fall within the scope of one or more embodiments of the specification.

The system, device, module, or unit elaborated in the embodiments may be achieved by a computer chip or entity or by a product having a function. One typical implementation apparatus is a computer, and a form of the computer may be a personal computer, a laptop computer, a cellular telephone, a camera phone, a smart phone, a personal digital assistant, a media player, a navigation device, an email device, a game console, a tablet computer, a wearable device, or a combination of any of the above apparatuses.

Computer readable media include both permanent and non-permanent, mobile and non-mobile media and may store information by any method or technology. The information may be a computer readable instruction, a data structure, a module of a program or other data. Examples of computer storage media include, but are not limited to, a phase change memory (PRAM), a static random access memory (SRAM), a dynamic random access memory (DRAM), other types of random access memory (RAM), a read only memory (ROM), an electrically erasable programmable read-only memory (EEPROM), a flash memory or other memory technologies, a read-only optical disk read-only memory (CD-ROM), a digital versatile disc (DVD) or other optical storages, a magnetic tape cassette, a magnetic disk storage or other magnetic storage devices or any other non-transmission medium for storing information that may be accessed by computing devices. As defined in the specification, the computer readable media do not include non-transitory media, such as modulated data signals and carriers.

It should be further noted that the terms of "including," "comprising," or any other variants of the terms are intended to encompass a non-exclusive inclusion, causing a process, method, product, or device comprising a series of elements to not only comprise these elements, but also comprise other elements that are not clearly listed, or further comprise elements that are inherent to the process, method, product, or device. When there is no further restriction, elements defined by the statement "comprising one . . . " does not exclude that a process, method, product, or device comprising the above elements further comprises additional identical elements.

The various embodiments in the specification are described in a progressive manner, the same or similar parts between the various embodiments may refer to each other, and each embodiment focuses on the differences from the other embodiments. In particular, since the system embodiments are substantially similar to the method embodiments, the system embodiments are described in a relatively simple manner, and the description of relevant parts of the method embodiments may be referenced.

What is claimed is:

1. A method for blockchain-based evidence storage, comprising:
    obtaining, from a computing device of a requester, a request for collecting evidence of infringement by an online resource, wherein the request comprises an address of the online resource;

obtaining the evidence of infringement from the address of the online resource;
generating verification information of the evidence of infringement by encrypting the evidence of infringement using an encryption algorithm to obtain a digest of the evidence of infringement;
storing the verification information of the evidence of infringement in a block on a blockchain;
storing a packaged file comprising the evidence of infringement in a cloud storage space and obtaining an access address of the packaged file in the cloud storage space;
obtaining, from the blockchain, a certificate of trusted evidence for the evidence of infringement, the certificate comprising the address of the online resource and an address of the block on the blockchain storing the verification information; and
sending, to the computing device of the requester, the verification information, the packaged file, the access address of the packaged file, and the certificate of trusted evidence.

2. The method of claim 1, wherein the obtaining the evidence of infringement from the address of the online resource comprises:
creating, based on the request for collecting evidence of infringement, an infringement evidence collection task, the infringement evidence collection task comprising the evidence of infringement from the address of the online resource; and
executing the infringement evidence collection task in a trusted environment.

3. The method of claim 1, wherein the certificate of trusted evidence further comprises identity information of the requester.

4. The method of claim 1, wherein the evidence of infringement comprises:
a routing process associated with the address of the online resource;
a responsiveness status associated with the address of the online resource;
content associated with the address of the online resource;
a screenshot image associated with the address of the online resource; or
a video record associated with the address of the online resource.

5. The method of claim 1, wherein the verification information of the evidence of infringement comprises:
a signature by a node associated with the blockchain on the digest of the evidence of infringement.

6. A system for blockchain-based evidence storage, comprising a processor and a memory device storing instructions executable by the processor to cause the system to perform operations comprising:
obtaining, from a computing device of a requester, a request for collecting evidence of infringement by an online resource, wherein the request comprises an address of the online resource;
obtaining the evidence of infringement from the address of the online resource;
generating verification information of the evidence of infringement by encrypting the evidence of infringement using an encryption algorithm to obtain a digest of the evidence of infringement;
storing the verification information of the evidence of infringement in a block on a blockchain;
storing a packaged file comprising the evidence of infringement in a cloud storage space and obtaining an access address of the packaged file in the cloud storage space;
obtaining, from the blockchain, a certificate of trusted evidence for the evidence of infringement, the certificate comprising the address of the online resource and an address of the block on the blockchain storing the verification information; and
sending, to the computing device of the requester, the verification information, the packaged file, the access address of the packaged file, and the certificate of trusted evidence.

7. The system of claim 6, wherein the obtaining the evidence of infringement from the address of the online resource comprises:
creating, based on the request for collecting evidence of infringement, an infringement evidence collection task, the infringement evidence collection task comprising the evidence of infringement from the address of the online resource; and
executing the infringement evidence collection task in a trusted environment.

8. The system of claim 6, wherein the certificate of trusted evidence further comprises identity information of the requester.

9. The system of claim 6, wherein the evidence of infringement comprises:
a routing process associated with the address of the online resource;
a responsiveness status associated with the address of the online resource;
content associated with the address of the online resource;
a screenshot image associated with the address of the online resource; or
a video record associated with the address of the online resource.

10. The system of claim 6, wherein the verification information of the evidence of infringement comprises:
a signature by a node associated with the blockchain on the digest of the evidence of infringement.

11. A non-transitory computer-readable storage medium for blockchain-based evidence storage, configured with instructions executable by one or more processors to cause the one or more processors to perform operations comprising:
obtaining, from a computing device of a requester, a request for collecting evidence of infringement by an online resource, wherein the request comprises an address of the online resource;
obtaining the evidence of infringement from the address of the online resource;
generating verification information of the evidence of infringement by encrypting the evidence of infringement using an encryption algorithm to obtain a digest of the evidence of infringement;
storing the verification information of the evidence of infringement in a block on a blockchain;
storing a packaged file comprising the evidence of infringement in a cloud storage space and obtaining an access address of the packaged file in the cloud storage space;
obtaining, from the blockchain, a certificate of trusted evidence for the evidence of infringement, the certificate comprising the address of the online resource and an address of the block on the blockchain storing the verification information; and sending, to the computing device of the requester, the verification information, the packaged file, the access address of the packaged file, and the certificate of trusted evidence.

12. The storage medium of claim 11, wherein the obtaining the evidence of infringement from the address of the online resource comprises:

creating, based on the request for collecting evidence of infringement, an infringement evidence collection task, the infringement evidence collection task comprising the evidence of infringement from the address of the online resource; and executing the infringement evidence collection task in a trusted environment.

13. The storage medium of claim 11, wherein the certificate of trusted evidence further comprises identity information of the requester.

14. The storage medium of claim 11, wherein the verification information of the evidence of infringement comprises:

a signature by a node associated with the blockchain on the digest of the evidence of infringement.

* * * * *